United States Patent
Patil et al.

(10) Patent No.: US 11,408,342 B2
(45) Date of Patent: Aug. 9, 2022

(54) SWIRL ANTI-ICING INJECTOR HEAD NOZZLE CONFIGURATIONS

(71) Applicant: ROHR, INC., Chula Vista, CA (US)

(72) Inventors: Yuvaraj Patil, Bangalore (IN); Radhakrishna Chilukuri, San Diego, CA (US); Vanukuri Venkatareddy, Bangalore (IN); Ashok Babu Saya, Bangalore (IN)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/135,072

(22) Filed: Dec. 28, 2020

(65) Prior Publication Data

US 2021/0285373 A1 Sep. 16, 2021

(30) Foreign Application Priority Data

Mar. 13, 2020 (IN) .............. 202041010913

(51) Int. Cl.
*F02C 7/047* (2006.01)
*B64D 15/04* (2006.01)
*B64D 15/00* (2006.01)

(52) U.S. Cl.
CPC .............. *F02C 7/047* (2013.01); *B64D 15/00* (2013.01); *B64D 15/04* (2013.01); *F05D 2300/701* (2013.01)

(58) Field of Classification Search
CPC .......... F02C 7/047; B64D 15/00; B64D 15/04
See application file for complete search history.

(56) References Cited

U.S. PATENT DOCUMENTS

| | | | |
|---|---|---|---|
| 4,688,745 A | 8/1987 | Rosenthal | |
| 6,131,855 A * | 10/2000 | Porte | B64D 29/00 244/134 B |
| 6,267,328 B1 | 7/2001 | Vest | |
| 9,494,050 B2 | 11/2016 | Schnoebelen et al. | |
| 9,950,799 B2 | 4/2018 | Anderson et al. | |
| 10,138,811 B2 | 11/2018 | Gally et al. | |
| 2002/0148929 A1* | 10/2002 | Andre | B64D 15/04 244/134 R |
| 2015/0026009 A1 | 1/2015 | Mishra | |

(Continued)

OTHER PUBLICATIONS

International Searching Authority, International Search Report and the Written Opinion dated Jun. 14, 2021 in Application No. PCT/US2021/021982.

*Primary Examiner* — Steven M Sutherland
(74) *Attorney, Agent, or Firm* — Snell & Wilmer L.L.P.

(57) ABSTRACT

An injector head for an anti-icing system may comprise a body configured to receive a pressurized gas, wherein the body is configured to provide the pressurized gas through a bulkhead into an interior volume of a D-duct, a first nozzle configured to generate a first flow of a first portion of the pressurized gas, a second nozzle configured to generate a second flow of a second portion of the pressurized gas, and a third nozzle configured to generate a third flow of a third portion of the pressurized gas, wherein the first nozzle is located at a distal end of the body relative to the bulkhead, and wherein a first hydraulic diameter of the first nozzle is less than each of a second hydraulic diameter of the second nozzle and a third hydraulic diameter of the third nozzle.

20 Claims, 11 Drawing Sheets

(56) References Cited

U.S. PATENT DOCUMENTS

2015/0086333 A1\* 3/2015 Schnoebelen .......... F01D 25/02
 415/117
2017/0058772 A1  3/2017 Frank et al.
2017/0210475 A1\* 7/2017 Wiberg ................. B64D 29/00
2017/0259926 A1\* 9/2017 Anderson .............. B64D 15/04

\* cited by examiner

SWIRL ANTI-ICING INJECTOR HEAD NOZZLE CONFIGURATIONS

CROSS-REFERENCE TO RELATED APPLICATIONS

This application claims priority to, and the benefit of, India Patent Application No. 202041010913, filed Mar. 13, 2020 and titled "SWIRL ANTI-ICING INJECTOR HEAD NOZZLE CONFIGURATIONS," which is incorporated by reference herein in its entirety for all purposes.

FIELD

The disclosure relates generally to vehicles and machinery and, more specifically, to anti-icing systems including nozzles that may be used with aircraft and aircraft engines.

BACKGROUND

In operation, a gas turbine engine nacelle may experience conditions in which icing may occur. For example, an engine nacelle of an aircraft, as well as other parts of the aircraft such as the wing leading edge, may experience the formation of ice when operating in cold or below-freezing temperatures. The formation of such ice may dramatically alter one or more flight characteristics of the aircraft. For example, the formation of ice may deleteriously affect the aerodynamics of the aircraft and add additional undesirable weight, as well as generate a hazard when such ice breaks off and potentially strikes another portion of the aircraft. For example, ice breaking loose from the leading edge of the gas turbine engine nacelle inlet may be ingested by the gas turbine engine and thereby severely damage the rotating fan, compressor, and turbine blades.

SUMMARY

In various embodiments, an injector head for an anti-icing system is disclosed comprising a body configured to receive a pressurized gas, wherein the body is configured to provide the pressurized gas through a bulkhead into an interior volume of a D-duct, a first nozzle configured to generate a first flow of a first portion of the pressurized gas, a second nozzle configured to generate a second flow of a second portion of the pressurized gas, and a third nozzle configured to generate a third flow of a third portion of the pressurized gas, wherein the first nozzle is located at a distal end of the body relative to the bulkhead, and wherein a first hydraulic diameter of the first nozzle is less than each of a second hydraulic diameter of the second nozzle and a third hydraulic diameter of the third nozzle.

In various embodiments, the first hydraulic diameter is between 65% and 90% of each of the second hydraulic diameter and the third hydraulic diameter. In various embodiments, a combined discharge coefficient of each of the first nozzle, the second nozzle, and the third nozzle is at least 0.90. In various embodiments, the third hydraulic diameter is at least 80% of the second hydraulic diameter. In various embodiments, the third flow is configured to contact the bulkhead. In various embodiments, the first nozzle is further configured to generate the first flow having a hot spot offset of between 10 times the first hydraulic diameter upstream and 30 times the first hydraulic diameter downstream. In various embodiments, a mass flow rate of the first flow is about 0.089 lbm/sec, a mass flow rate of the second flow is about 0.167 lbm/sec, and a mass flow rate of the third flow is about 0.162 lbm/sec.

In various embodiments an anti-icing system for an annular inlet of a gas turbine engine is disclosed comprising a D-duct comprising an inlet lip and a bulkhead enclosing a mass of air within an annular space therebetween, the inlet lip having an inner lipskin and an outer lipskin, a high pressure source of hot gas, a conduit coupled at a first end to the high pressure source of hot gas, wherein an opposite end of the conduit penetrates the bulkhead at a penetration point, an injector head within the D-duct coupled at the opposite end of the conduit and proximate the penetration point, the injector head in fluid communication with the high pressure source of hot gas and comprising, a body configured to receive a pressurized gas from the high pressure source of hot gas, wherein the body is configured to provide the pressurized gas through the bulkhead into the annular space, a first nozzle configured to generate a first flow of a first portion of the pressurized gas, a second nozzle configured to generate a second flow of a second portion of the pressurized gas, a third nozzle configured to generate a third flow of a third portion of the pressurized gas, wherein the first nozzle is located at a distal end of the body relative to the bulkhead, and wherein a first hydraulic diameter of the first nozzle is less than each of a second hydraulic diameter of the second nozzle and a third hydraulic diameter of the third nozzle.

In various embodiments, the penetration point is located between 30% to 80% of a bulkhead height from an inboard edge of the bulkhead. In various embodiments, the first hydraulic diameter is between 65% and 90% of each of the second hydraulic diameter and the third hydraulic diameter. In various embodiments, a combined discharge coefficient of each of the first nozzle, the second nozzle, and the third nozzle is at least 0.90. In various embodiments, the third hydraulic diameter is at least 80% of the second hydraulic diameter. In various embodiments, the third flow contacts the bulkhead. In various embodiments, the first nozzle is further configured to generate the first flow having a hot spot offset of between 10 times the first hydraulic diameter upstream and 30 times the first hydraulic diameter downstream. In various embodiments, a mass flow rate of the first flow is about 0.089 lbm/sec, a mass flow rate of the second flow is about 0.167 lbm/sec, and a mass flow rate of the third flow is about 0.162 lbm/sec.

In various embodiments, anti-icing method for a gas turbine engine comprises a D-duct comprising an inlet lip and a bulkhead enclosing a mass of air within an annular space therebetween, the inlet lip having an inner lipskin and an outer lipskin, a high pressure source of hot gas, an injector head comprising a body configured to introduce the high pressure source of hot gas through the bulkhead into the mass of air within the D-duct, a first nozzle configured to generate a first flow of a first portion of the high pressure source of hot gas, a second nozzle configured to generate a second flow of a second portion of t the high pressure source of hot gas, and a third nozzle configured to generate a third flow of a third portion of t the high pressure source of hot gas, wherein the first nozzle is located at a distal end of the body relative to the bulkhead, and wherein a first hydraulic diameter of the first nozzle is less than each of a second hydraulic diameter of the second nozzle and a third hydraulic diameter of the third nozzle, and introducing the first flow, the second flow, and the third flow into the mass of air within the D-duct in a direction substantially tangential to the inner lipskin to entrain the mass of air in a circulating flow within the D-duct, and generating by the first flow a hot spot on the outer lipskin having an offset of between 10 times the first hydraulic diameter upstream and 30 times the first hydraulic diameter downstream.

In various embodiments, third hydraulic diameter is at least 80% of the second hydraulic diameter. In various embodiments, the combined discharge coefficient of each of the first nozzle, the second nozzle, and the third nozzle is at least 0.90. In various embodiments, the method includes contacting the third flow with the bulkhead. In various embodiments, the first hydraulic diameter is between 65% and 90% of each of the second hydraulic diameter and the third hydraulic diameter.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
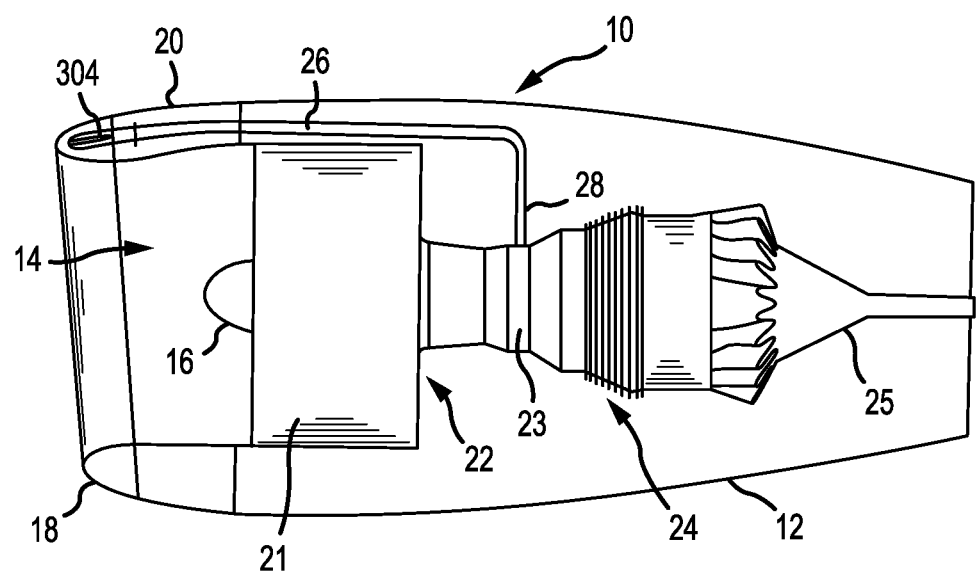
FIG. 1 illustrates an exemplary gas turbine engine and nacelle anti-icing system, in accordance with various embodiments.

In various embodiments and with reference to FIG. 1, a gas turbine engine 10 is provided and housed within a nacelle 12, of which some components are omitted for clarity. Gas, such as air, enters the gas turbine engine 10 through an annular inlet section 14, between the cap 16 (or spinner) of the engine and the annular inlet lip 18 or annular housing which constitutes the forward most section of the engine inlet housing 20 of nacelle 12. Gas turbine engine may produce thrust by: (i) compressing a gas to a core air flow in a compressor section 22 forward of a combustor section 23 positioned with the gas turbine engine core, burning incoming core air flow and fuel within the combustor section 23, and expanding the combustor exhaust through a turbine section 24 aft of the combustor section; and (ii) compressing and passing a large mass bypass air flow of inlet air through the fan section 21 of the gas turbine engine. Hot, high-pressure exhaust gases from the turbine section 24 of the engine 10 pass through exhaust outlet 25 and out the rear of the engine 10. The compressed bypass fan air flows past the outside of the engine core within the engine nacelle cowl housing 12 and exits at the rear of the engine 10.

In various embodiments and when operating in flight under icing conditions, ice may tend to form on the inlet lip 18 of nacelle 12. The ice may alter the geometry of the inlet area between the inlet lip 18 and the spinner 16 tending thereby to disrupt airflow within annular inlet section 14 and reducing gas turbine engine 10 performance. In like regard, ice buildup on the external surfaces of the inlet may tend to disrupt airflow around the nacelle 12 thereby tending to increase drag. In various embodiments, ice may periodically break free from these components and may be ingested into fan section 21 or compressor section 22 tending thereby to damage internal components of engine 10 such as, for example, stator vanes, rotor blades, radiators, ducting, etc.

Figure 2:
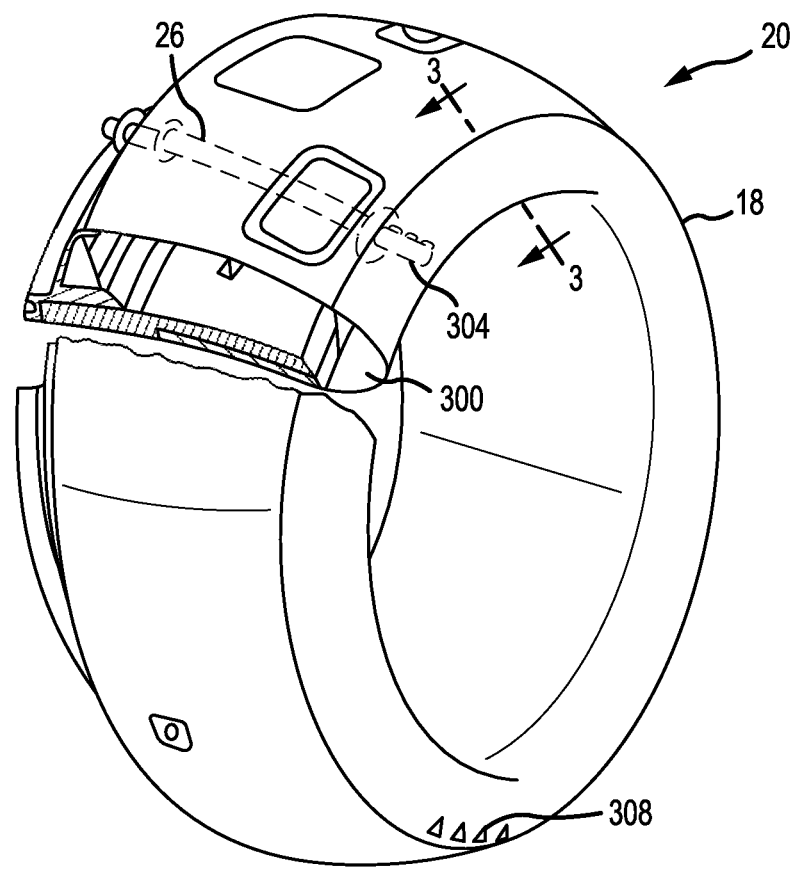
FIG. 2 illustrates a gas turbine engine inlet housing having including an anti-icing system injector head, in accordance with various embodiments.
Figure 3A:
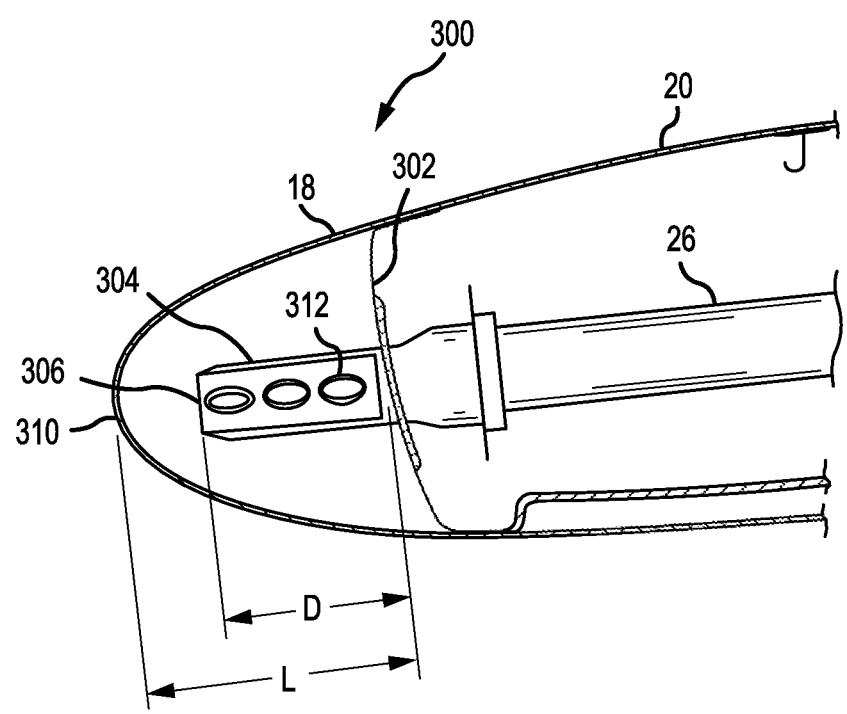
FIG. 3A illustrates a cross section taken along line 3-3 of FIG. 2, in accordance with various embodiments.
Figure 3B:
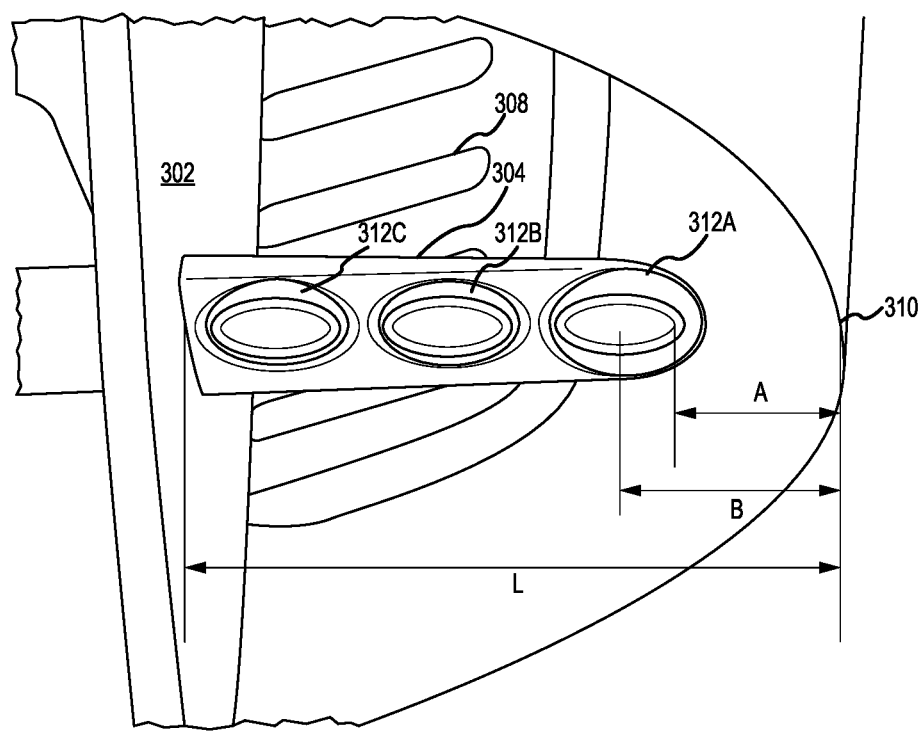
FIG. 3B illustrates a cross section of a D-duct of FIG. 2, in accordance with various embodiments.

In various embodiments and with additional reference to FIGS. 2, 3A, and 3B, an anti-icing system may comprise a conduit 26 coupled at a first end 28 to a bleed air source of gas turbine engine 10 which provides relatively hot, high pressure, bleed air. In various embodiments, the bleed air source temperature may be between 400° F. and 1200° F. and the source pressure may be between 30 psig and 100 psig. The other end of conduit 26 passes through inlet housing 20 and penetrates D-duct 300 through a bulkhead 302 which encloses a quantity of air within the annular space created by bulkhead 302 and inlet lip 18. Conduit 26 is fluidly coupled to an injector head 304 which extends into D-duct 300 from bulkhead 302. D-duct 300 may extend a distance L between bulkhead 302 and the leading edge 310 of inlet lip 18. Body 306 of injector head 304 comprises a plurality of nozzles 312 (i.e., a first nozzle 312A, a second nozzle 312B, a third nozzle 312C, etc.). In various embodiments, each of the nozzles (312A, 312B, 312C) may be equally spaced and elliptically shaped injection nozzles that are serially arranged along the injector head 304. The injector head 304 may extend longitudinally from the bulkhead 302 into the D-duct 300 a distance that is preferably less than two-thirds the distance from the bulkhead to the leading edge 310.

Each of the nozzles 312 are configured to inject a corresponding portion of the hot, high pressure, bleed air into the annular space of the D-duct 300. In this regard, the first nozzle 312A is configured to generate a first flow of a first portion of a pressurized gas, the second nozzle 312B is configured to generate a second flow of a second portion of the pressurized gas, and the third nozzle 312C is configured to generate a third flow of a third portion of the pressurized gas. The combined discharge coefficient of the nozzles 312 may be at least 0.90. In various embodiments, the mass flow rate of the first flow may be about 0.089 lbm/sec [0.040 kg/s], the mass flow rate of the second flow may be about 0.167 lbm/sec [0.076 kg/s], and the mass flow rate of the third flow may be about 0.162 lbm/sec [0.073 kg/s] where about in this context means±15%.

Each of the nozzles 312 have a corresponding hydraulic diameter, e.g., a first hydraulic diameter, a second hydraulic diameter, a third hydraulic diameter, etc. It will be appreciated that a hydraulic diameter may be defined by a function of the hydraulic radius which is defined as twice the cross-sectional area of the flow (A) divided by the wetted perimeter of the cross-section (P), i.e. $R_H=(2A)/P$. In this regard $D_H=2R_H$. In various embodiments, the first hydraulic diameter of the first nozzle 312A is less than each of the hydraulic diameters corresponding to the second nozzle 312B and the third nozzle 312C. In various embodiments, the first hydraulic diameter is between 65% and 90% of each of the second hydraulic diameter and the third hydraulic diameter. In like regard and in various embodiments, the first nozzle area is between 40% and 85% of each of the second nozzle area and the third nozzle area. In various embodiments, the first nozzle 312A is the outermost nozzle at a distal end of the body 306 relative to the bulkhead 302. A centerline of the first nozzle 312A may extend into D-duct 300 a distance D between 30% of L and 95% of L, or between 50% and 90% of L, or between 30% and 80% of L, or between 80% and 90% of L. In various embodiments, the centerline of the first nozzle 312A may lie a distance B from the leading edge 310 of inlet lip 18 and a proximate edge of the first nozzle exit may lie a distance A from the leading edge 310. It will be appreciated that the distance B may be selected based on the constraints of various D-duct geometries. In various embodiments, the distance B may about 1.9 inches where about in this context means±15%.

Figure 4:
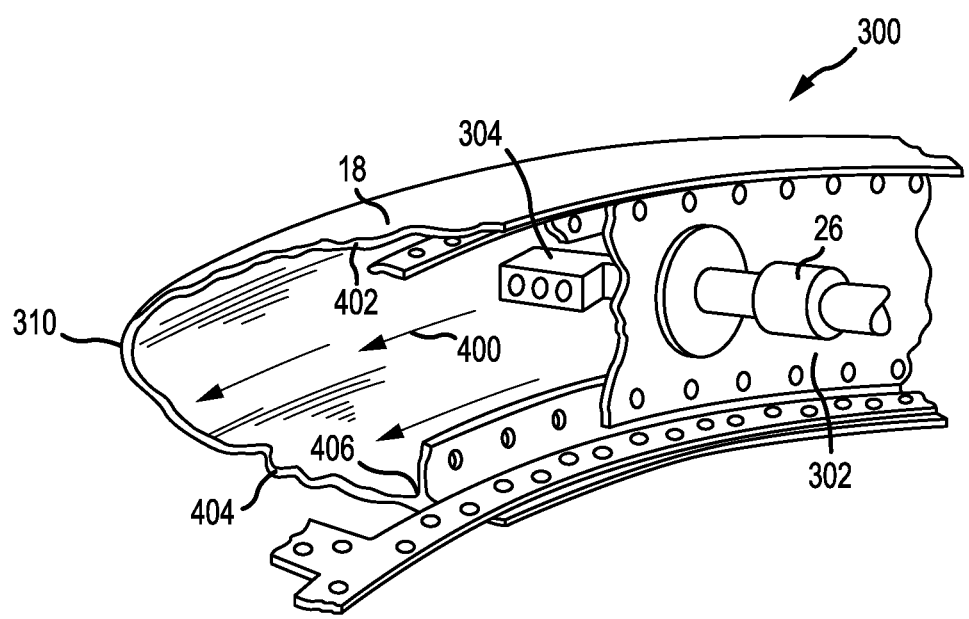
FIG. 4 illustrates a schematic perspective of the details of the D-duct of the anti-icing system, in accordance with various embodiments.

In various embodiments and with additional reference to FIG. 4, a schematic perspective of the details of D-duct 300 of the anti-icing system is shown illustrating circulating D-duct flow 400. Cool, moisture-laden, free-stream air scrubs the exterior of the inlet lip 18 skin, with impinging super-cooled droplets tending to accumulate as ice. Injector head 304 injects the bleed air through the plurality of nozzles 312 into the mass of air within the D-duct 300 and entrains the air mass to induce circulating D-duct flow 400 in a rotational circulatory motion. The relatively hot and high pressure bleed air mixes with mass of air within the D-duct 300 to increase the temperature of the D-duct air mass to an intermediate temperature sufficient to preclude the formation of ice along inlet lip 18. In various embodiments, the injector head 304 may be oriented with a centerline of each of the plurality of nozzles 312 and/or an injector head face relatively tangential to the curve of the inner lispkin 404 of D-duct 300. In this regard, bleed air exiting the nozzles 312 may graze the inner lipskin 404 before eventually impacting the interior surface of the inlet outer lipskin 402. Bleed air exiting the nozzles 312 may impact an area of the interior surface of inlet outer lipskin 402 in line with the jet flow from the nozzles 312 tending thereby to elevate the temperature of the impact area (i.e., thereby generating a hot spot) relative to the remaining area of the inlet lip 18. In various embodiments, the hot spot may cover an area of the outer lipskin 402.

As bleed air is injected via injector head 304, a portion of circulating D-duct flow 400 may recirculate within D-duct 300 while a portion of D-duct flow 400 may exit the D-duct 300 through exhaust ports 308 (FIGS. 2 and 3B) to the atmosphere. At steady state, the hot air injection inflow into the D-Duct through the injector head equals outflow of spent air through the exhaust ports 308. In various embodiments, ejector-like pumping within enclosed geometry of the D-duct 300 results in the circulating flow 400 inside the D-duct 300 which may be several times larger than the injection flow rate. Stated another way, the resulting circulating flow 400 may be described as a self-communicating ejector wherein the D-Duct flow being pumped in the nozzle region circulates around within the inlet lip, to once again re-enter the nozzle region. Circulation enhances heat transfer, but skews velocity towards the outer lipskin 402, thereby favoring of heat rejection to outer lipskin 402. Stated another way, the circulating flow 400 inside the D-duct tends to result in a higher speed flow near the outer lipskin 402 of the inlet lip 18 and a lower speed flow near the inner lipskin 404 of inlet lip 18. The magnitude of the circulating flow may be limited by D-duct wall friction and drag at the injector head 304. In various embodiments, the slowest flow is observed proximate the corner 406 between the inner lipskin 404 and the bulkhead 302. In various embodiments, corner 406 may comprise an acute angle tending to benefit heating of the inner lipskin 404 toward a throat station of the inlet.

An ideal geometric impact area of the jet flow at the outer lipskin may be determined by a geometric ray line extending from the nozzle centerline to the outer lipskin. In the steady state circulating flow 400 environment, the actual flow path of the jet flow from a nozzle tends to deviate from the geometric ray line by turning relatively radially outward into the high speed flow. In traditional nozzle geometries, this turned flow tends to shift the actual impact area of the nozzle jet flow from the ideal geometric impact relatively toward the injector head thereby tending to decrease the mixing time of the jet flow within the circulating flow. The deviation of the jet flow from the geometric ray line is evidenced by a positional shift in the hot spot (circumferentially along the lipskin toward the nozzle) and a related lipskin temperature increase at the hot spot. In this regard, traditional nozzle geometries may tend to increase hot spot temperatures above a structural temperature limit of the lipskin material.

Figure 5:
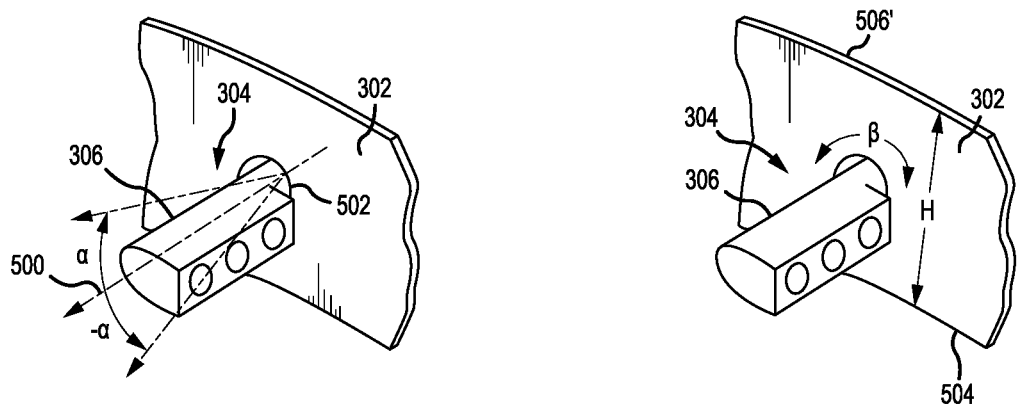
FIG. 5 illustrates geometries of an injector head, in accordance with various embodiments.

With additional reference to FIG. 5, body geometries and orientations of an injector head 304 are shown with relation to bulkhead 302. Body 306 of injector head 304 extends from bulkhead 302 along a perpendicular centerline 500 that is perpendicular to the bulkhead 302. In various embodiments, body 306 may be oriented at an angle α relatively away from the centerline. Stated another way, body 306 may be "bent" proximate the penetration point 502 at bulkhead 302. In like regard and in various embodiments, body 306 may be rotated to an angle β relative to a perpendicular plane extending from bulkhead 302. Bulkhead has a height H defined between an inboard edge 504 and an outboard edge 506 and the penetration point 502 may be located between 30% to 80% of H taken as taken from the inboard edge 504 (proximate the inner lipskin 404).

Figure 6A:
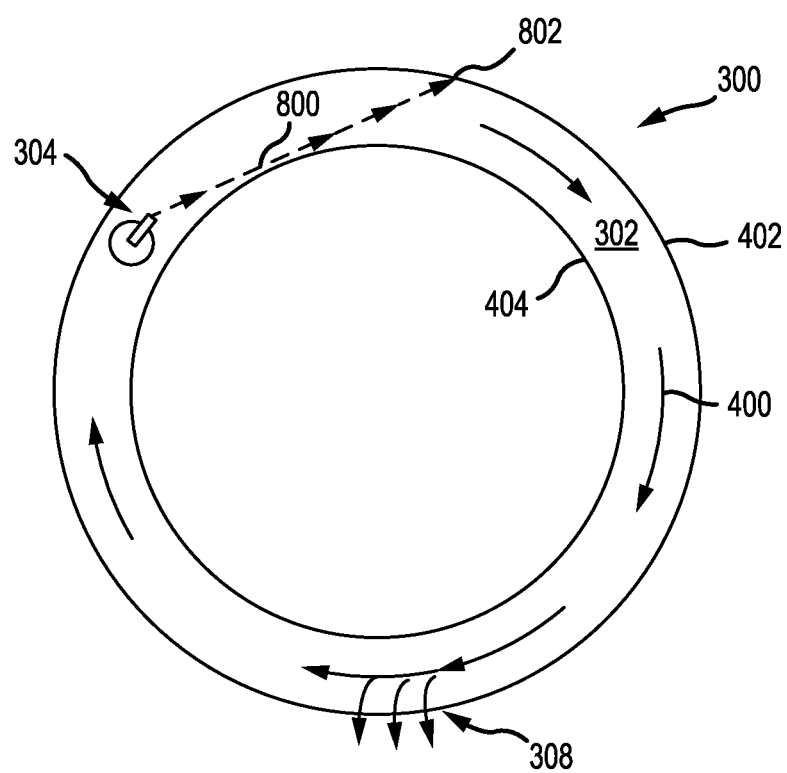
FIG. 6A illustrates a simplified D-duct flow field corresponding to the injector head nozzle arrangement of FIGS. 3A and 3B, in accordance with various embodiments.

With additional reference to FIG. 6A, a simplified D-duct flow field corresponding to the nozzles 312 arrangement of FIGS. 3A and 3B is illustrated. The centerline of each of the nozzles 312 of injector head 304 may be directed along a geometric ray line 604 projected from the centerline relatively tangent to the inner lipskin 404 of the D-duct 300. In various embodiments, the ray line 604 may describe generally a mean flow path for each of the first flow, the second flow, and the third flow tending thereby to create a hot spot 608 proximate an ideal impact area 606 defined at the intersection of the geometric ray line 604 and the outer lipskin 402.

Figure 6B:
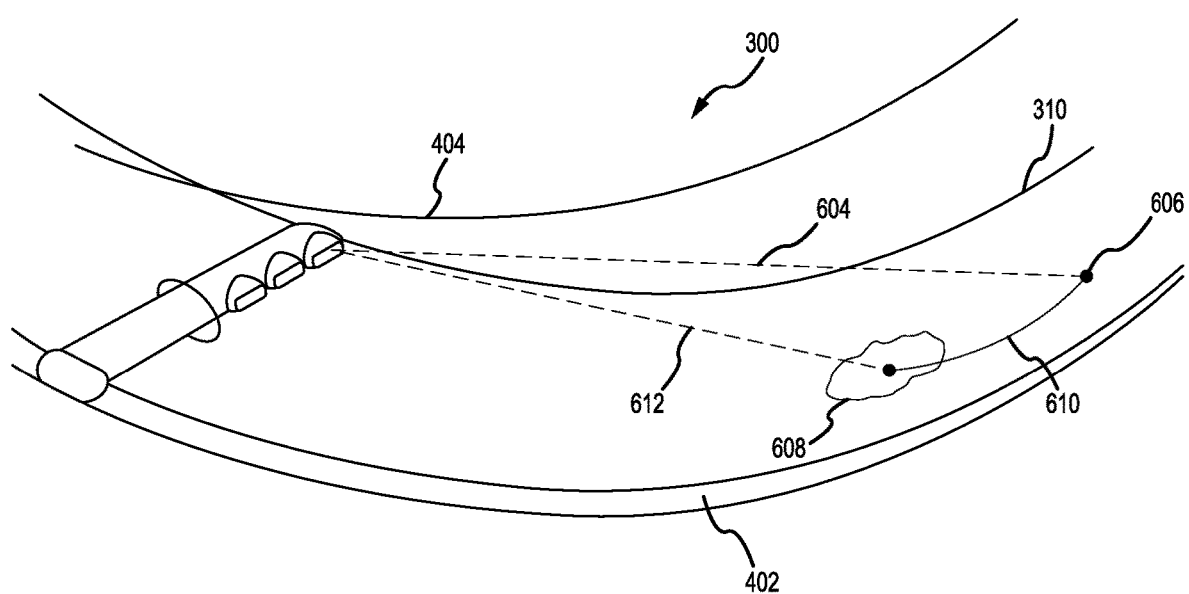
FIG. 6B illustrates geometries of a simplified D-duct flow field, in accordance with various embodiments.

In various embodiments and with additional reference to FIG. 6B, the first flow may be configured to generate hot spot 608 which is offset circumferentially along a line 610 following the circumferential curve of the outer lipskin 402. In this regard, an actual impact distance 612 may be constructed from point of impact of the first flow (i.e. at the hot spot 608) to the nozzle 312A and a deviation (e.g., a hot spot offset) between the geometric impact distance (along the geometric ray line 604 to ideal impact area 606) may be determined in either an upstream (i.e., relatively toward the nozzle) or a downstream direction (i.e., relatively away from the nozzle). In various embodiments, the first flow may be configured to have a hot spot offset of between 3 and 10 times the first hydraulic diameter of the first nozzle 312A. In various embodiments, the hot spot offset may be between 4 and 7 times the first hydraulic diameter, or may be between 5 and 6 times the first hydraulic diameter, or may be between 5 and 10 times the first hydraulic diameter upstream and between 10 and 30 times the first hydraulic diameter downstream. In this regard, the injector head 304 may tend to increase the mixing time of the jet flow from the nozzles 312 and thereby tend to minimize hot spot temperatures and inhibit thermal fatigue and/or distress of the lipskin material. In various embodiments the geometric impact distance of the first nozzle may be between 21 and 25 inches [53.3 and 63.5 cm]. In various embodiments, the actual impact distance of the first nozzle may be between 15 inches [38.1 cm] and 23 inches [58.4 cm], or may be between 16 inches [40.6 cm] and 20 inches [50.8 cm], or may be between, 16.7 inches [42.4 cm] and 20 inches [50.8 cm], or may be between 18.5 inches [47.0 cm] and 20 inches [50.8 cm], or may be about 16.8 inches [42.7 cm] where about in this context means±15%.

It will be appreciated that each of the nozzles 312 may be configured such that the respective jet flow is directed independently relatively toward or away from the point of tangency as measured by an angle T between the respective geometric ray line and the tangent plane to inner lipskin. For example, the first nozzle may be configured such that the first flow directed away from the point of tangency where T is 10°, the second nozzle may be configured such that the second flow is directed at the point of tangency where T is 0°, and the third nozzle may be configured such that the third flow is directed at the inner lipskin 404 where T is −10°. In various embodiments, the first nozzle may be configured such that T is between 0° and 15° thereby tending to avoid an undesirable early impingement on the inner lipskin. In like regard, each of the nozzles 312 may be configured such that the respective jet flow is directed relatively toward or away from the bulkhead 302. In various embodiments, the third flow from the third nozzle may be directed to brush or contact the bulkhead 302. It will be appreciated that enabling the third flow to brush against the bulkhead may tend to minimize hot spot temperatures (thereby tending to reduce lipskin material distress), without adversely impacting performance of the anti-icing system. In various embodiments, the bulkhead 302 may comprise a relatively high temperature material in comparison to the lipskin such as, for example, one of a titanium alloy, a stainless steel, a nickel-steel, and or the like.

Figure 7A:
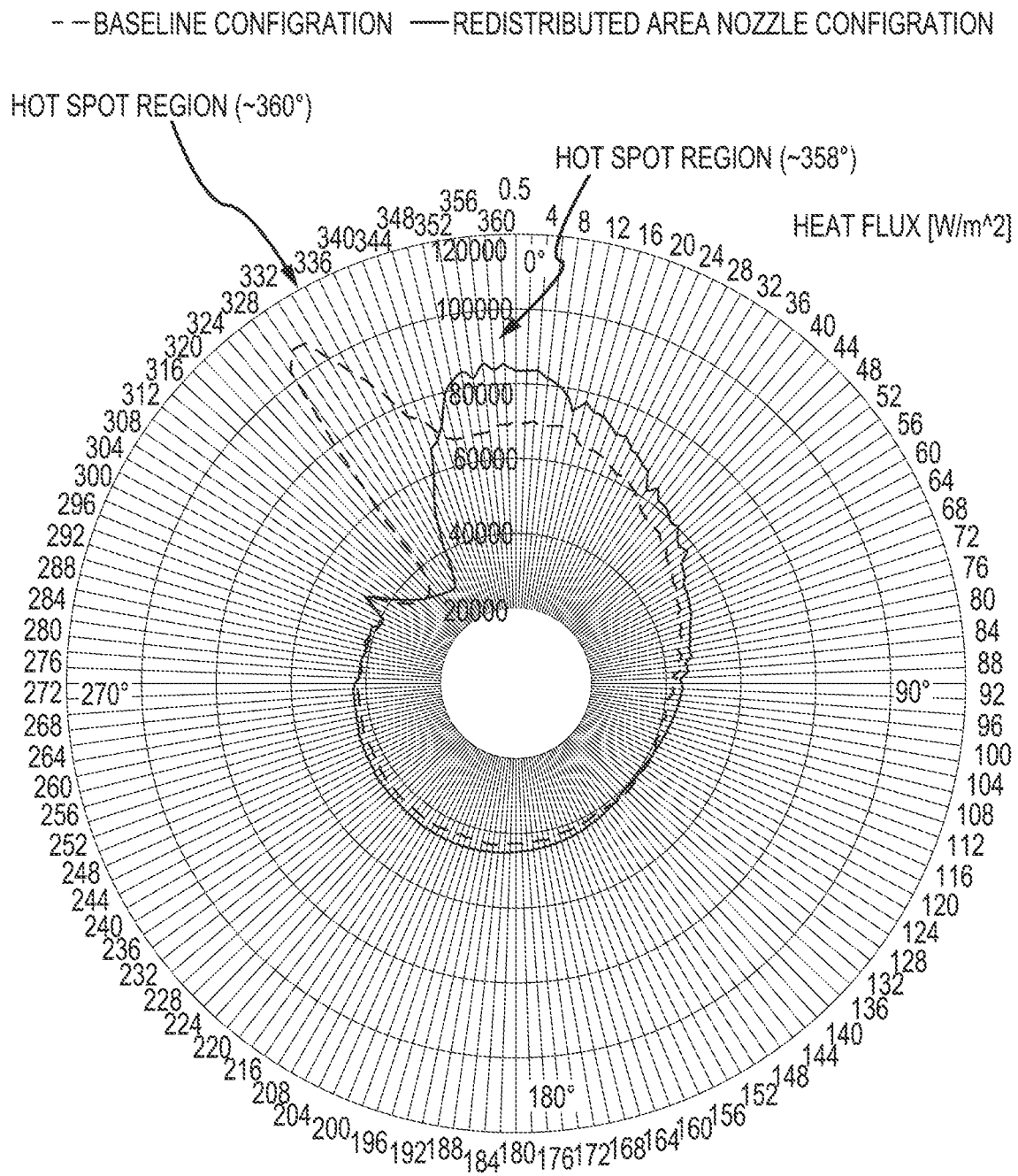
FIG. 7A illustrates a polar plot of outer lipskin heat flux on a circumferential line passing through the hot spot, in accordance with various embodiments.
Figure 7B:
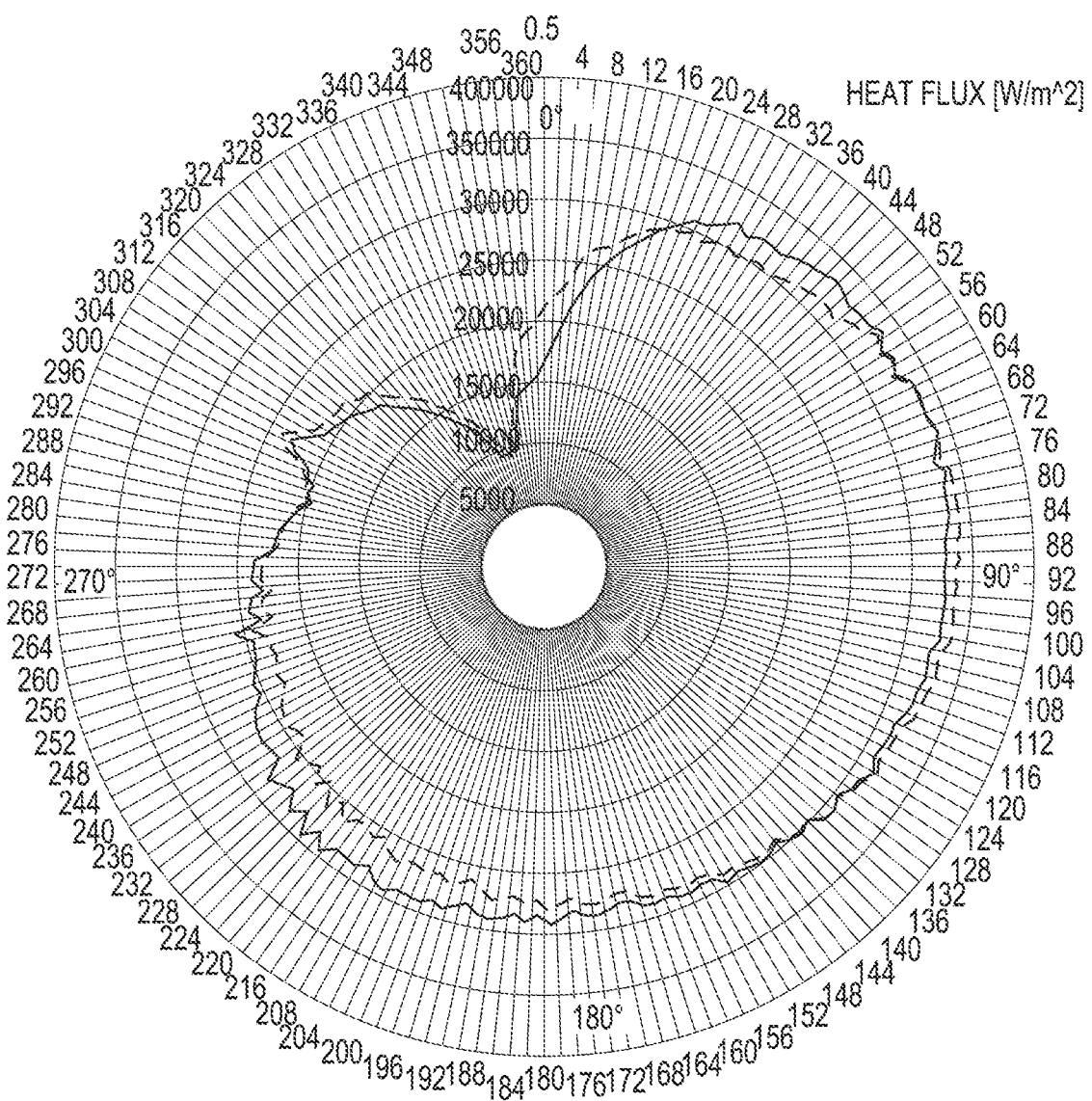
FIG. 7B illustrates a polar plot of inner lipskin heat flux on a circumferential line at a constant distance from the highlight, in accordance with various embodiments.

With additional reference to FIGS. 7A and 7B, polar plots of the heat flux in the outer lipskin and the inner lipskin, respectively, are illustrated in accordance with various embodiments. The injector head 304 is located at the 300° position of each plot. FIG. 7A shows the hot spot region evidenced by the heat flux spike at about 330° for a configuration where each of the nozzles 312 have an identical hydraulic diameter (labeled baseline configuration). However, where the hydraulic diameter of the first nozzle 312A is reduced in comparison to the second and third nozzles (312B, 312C) while keeping the same total hydraulic diameter (labeled redistributed area nozzle configuration) greater than expected results were achieved. The hot spot region shifts away from the injector head to about 358° and is diminished in severity as evidenced by an order of magnitude reduction in heat flux. Furthermore, the inner lipskin heat flux as shown in FIG. 7B remains relatively unchanged and the alternative configuration evidences several areas of comparative cold zone heating improvement over the baseline configuration.

Figure 8:
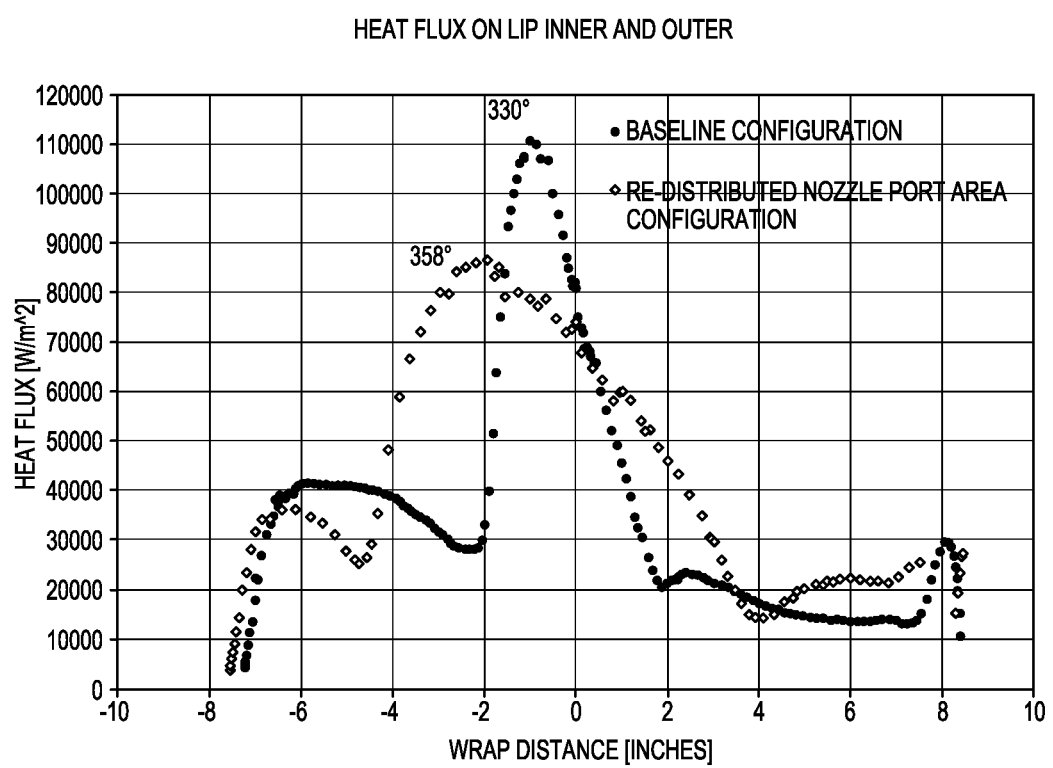
FIG. 8 illustrates a plot of heat flux along the wrap of the lipskin passing through the hotspot, in accordance with various embodiments.

These unexpected results are further illustrated by FIG. 8 which shows a plot of the heat flux through a cross section of the lipskin at the hot spot. The heat flux is shown on the Y axis. The wrap distance is displayed in inches from the leading edge 310 along the lip toward the bulkhead. In this regard, the zero point of the X axis is the leading edge 310 of the lipskin with the negative indicating positions toward the outer lipskin and positive indicating positions toward the inner lipskin. An order of magnitude reduction in peak heat flux over the baseline configuration is achieved in addition to a more even (flattened) distribution of heating across the lipskin. In this regard, thermal distress in the lipskin material may be reduced tending to prolong the life of the inlet lip 18

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An injector head for an anti-icing system comprising:
a body configured to receive a pressurized gas, wherein the body is configured to provide the pressurized gas through a bulkhead into an interior volume of a D-duct;
a first nozzle configured to generate a first flow of a first portion of the pressurized gas;
a second nozzle configured to generate a second flow of a second portion of the pressurized gas; and
a third nozzle configured to generate a third flow of a third portion of the pressurized gas,
wherein the first nozzle is located at a distal end of the body relative to the bulkhead, and
wherein a first hydraulic diameter of the first nozzle is less than each of a second hydraulic diameter of the second nozzle and a third hydraulic diameter of the third nozzle.

2. The injector head of claim 1, wherein the first hydraulic diameter is between 65% and 90% of each of the second hydraulic diameter and the third hydraulic diameter.

3. The injector head of claim 1, wherein a combined discharge coefficient of each of the first nozzle, the second nozzle, and the third nozzle is at least 0.90.

4. The injector head of claim 1, wherein the third hydraulic diameter is at least 80% of the second hydraulic diameter.

5. The injector head of claim 1, wherein the third flow is configured to contact the bulkhead.

6. The injector head of claim 1, wherein the first nozzle is further configured to generate the first flow having a hot spot offset of between 10 times the first hydraulic diameter upstream and 30 times the first hydraulic diameter downstream.

7. The injector head of claim 1, wherein a mass flow rate of the first flow is about 0.089 lbm/sec, a mass flow rate of the second flow is about 0.167 lbm/sec, and a mass flow rate of the third flow is about 0.162 lbm/sec.

8. An anti-icing system for an annular inlet of a gas turbine engine comprising:
a D-duct comprising an inlet lip and a bulkhead enclosing a mass of air within an annular space therebetween, the inlet lip having an inner lipskin and an outer lipskin;
a high pressure source of hot gas;
a conduit coupled at a first end to the high pressure source of hot gas, wherein an opposite end of the conduit penetrates the bulkhead at a penetration point;
an injector head within the D-duct coupled at the opposite end of the conduit and proximate the penetration point, the injector head in fluid communication with the high pressure source of hot gas and comprising:
a body configured to receive a pressurized gas from the high pressure source of hot gas, wherein the body is configured to provide the pressurized gas through the bulkhead into the annular space;
a first nozzle configured to generate a first flow of a first portion of the pressurized gas,
a second nozzle configured to generate a second flow of a second portion of the pressurized gas,
a third nozzle configured to generate a third flow of a third portion of the pressurized gas,
wherein the first nozzle is located at a distal end of the body relative to the bulkhead, and
wherein a first hydraulic diameter of the first nozzle is less than each of a second hydraulic diameter of the second nozzle and a third hydraulic diameter of the third nozzle.

9. The anti-icing system of claim 8, wherein the penetration point is located between 30% to 80% of a bulkhead height from an inboard edge of the bulkhead.

10. The anti-icing system of claim 8, wherein the first hydraulic diameter is between 65% and 90% of each of the second hydraulic diameter and the third hydraulic diameter.

11. The anti-icing system of claim 10, wherein the third hydraulic diameter is at least 80% of the second hydraulic diameter.

12. The anti-icing system of claim 8, wherein a combined discharge coefficient of each of the first nozzle, the second nozzle, and the third nozzle is at least 0.90.

13. The anti-icing system of claim 8, wherein the third flow contacts the bulkhead.

14. The anti-icing system of claim 8, wherein the first nozzle is further configured to generate the first flow having a hot spot offset of between 10 times the first hydraulic diameter upstream and 30 times the first hydraulic diameter downstream.

15. The anti-icing system of claim 8, wherein a mass flow rate of the first flow is about 0.089 lbm/sec, a mass flow rate of the second flow is about 0.167 lbm/sec, and a mass flow rate of the third flow is about 0.162 lbm/sec.

16. An anti-icing method for a gas turbine engine comprising:
a D-duct comprising an inlet lip and a bulkhead enclosing a mass of air within an annular space therebetween, the inlet lip having an inner lipskin and an outer lipskin;
a high pressure source of hot gas;
an injector head comprising a body configured to introduce the high pressure source of hot gas through the bulkhead into the mass of air within the D-duct;
a first nozzle configured to generate a first flow of a first portion of the high pressure source of hot gas;
a second nozzle configured to generate a second flow of a second portion of the high pressure source of hot gas; and a third nozzle configured to generate a third flow of a third portion of the high pressure source of hot gas, wherein the first nozzle is located at a distal end of the body bulkhead, and wherein a first hydraulic diameter of the first nozzle is less than each of a second hydraulic diameter of the second nozzle and a third hydraulic diameter of the third nozzle; and introducing the first flow, the second flow, and the third flow into the mass of air within the D-duct in a direction substantially tangential to the inner lipskin to entrain the mass of air in a circulating flow within the D-duct; and generating by the first flow a hot spot on the outer lipskin having an offset of between 5 and 10 times the first hydraulic diameter.

17. The method of claim 16, wherein the third hydraulic diameter is at least 80% of the second hydraulic diameter.

18. The method of claim 16, wherein the combined discharge coefficient of each of the first nozzle, the second nozzle, and the third nozzle is at least 0.90.

19. The method of claim 16, further comprising contacting the third flow with the bulkhead.

20. The method of claim 16, wherein the first hydraulic diameter is between 65% and 90% of each of the second hydraulic diameter and the third hydraulic diameter.

* * * * *